(12) United States Patent
Melanson

(10) Patent No.: US 9,035,587 B2
(45) Date of Patent: May 19, 2015

(54) MOTOR CONTROL LOOP WITH FAST RESPONSE

(71) Applicant: Cirrus Logic, Inc., Austin, TX (US)

(72) Inventor: John Laurence Melanson, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 48 days.

(21) Appl. No.: 13/827,031

(22) Filed: Mar. 14, 2013

(65) Prior Publication Data

US 2014/0265968 A1  Sep. 18, 2014

(51) Int. Cl.
*H02P 6/00* (2006.01)
*H02P 6/18* (2006.01)

(52) U.S. Cl.
CPC .......................................... *H02P 6/18* (2013.01)

(58) Field of Classification Search
CPC .................................................. H02P 21/0089
USPC ................................. 318/400.32, 400.31, 700
See application file for complete search history.

(56) References Cited

U.S. PATENT DOCUMENTS

| | | | | |
|---|---|---|---|---|
| 5,796,228 A | * | 8/1998 | Kojima et al. | ................. 318/605 |
| 7,075,264 B2 | * | 7/2006 | Huggett et al. | ........... 318/400.02 |
| 7,339,344 B2 | * | 3/2008 | Borisavljevic | ................ 318/723 |
| 7,348,758 B2 | * | 3/2008 | Ho | ................................ 318/811 |
| 2006/0043923 A1 | * | 3/2006 | Baker et al. | ................... 318/807 |
| 2012/0249033 A1 | | 10/2012 | Qin | |

OTHER PUBLICATIONS

Texas Instruments, "Designing High-Performance and Power-Efficient Motor Control Systems," B. Novak and B. Akin, Jun. 2009.

* cited by examiner

*Primary Examiner* — David S Luo
(74) *Attorney, Agent, or Firm* — Steven Lin, Esq.

(57) ABSTRACT

A system and method of controlling a motor are disclosed. The system comprises a current observer for observing a motor current at a sampling rate and a proportionate-integral controller that provides a proportionate path and an integral path and at least forms part of a proportionate-integral control loop based on the motor current. The current observer observes a motor current of the motor at a sampling rate. The proportionate path calculates, for a present cycle of the sampling rate, a proportionate path term for the proportionate-integral control loop based on the motor current. The system outputs a respective motor output voltage to the motor in conformity with the proportionate path term calculated for the present cycle. In conformity with the motor current, the integral path calculates an integral path term for another respective motor output voltage to be used in a later cycle of the sampling rate.

20 Claims, 7 Drawing Sheets

MOTOR CONTROL LOOP WITH FAST RESPONSE

FIELD OF INVENTION

The present invention generally relates to motor controllers, and, more particularly, to a method and system of controlling a motor in general and controlling the torque of the motor.

BACKGROUND OF THE INVENTION

Motor controllers control motors in general, and, in particular, control the torque outputs of motors by regulating the current. Motor controllers utilizing current control loops in controlling motors are well known in the art. The current control loop may be placed inside of a speed or position control loop. The control loops requires, as an input, the rotational motor position. Typically, the current is controlled to be in alignment with the rotational motor position. One way of determining motor position is by using a sensorless motor control approach. The sensorless motor control approach does not use a sensor to sense the position of the motor but instead typically uses an observer. The observer is herein defined as an operational block, device, or system that determines the motor position as a function of the electrical input/output ("I/O") of the motor. They have been developed to avoid at least some of the issues that sensors typically add. The electrical I/O is typically the voltages and currents present at the terminals of the motor.

FIG. 1 shows a conventional sensorless, field-oriented control (FOC) motor control system 100 in accordance with the prior art. Motor control system 100 generally includes a motor controller 102, a power supply 120, an inverter 122, a motor 124, and a current observer 126. The motor 124 is typically a permanent magnet synchronous motor (PMSM) or brushless direct current (BLDG) motor. Typically, the motor has three terminals, although other configurations are also used. The motor controller 102 generally comprises a proportionate-integral ("PI") controller 103, an inverse Park converter 108, an inverse Clarke converter 110, a three phase (3-Ø) pulse width modulation (PWM) controller block 112, and a rotor position observer 118. The inverse Park converter 108 performs inverse Park transformations on the outputs from the PI controller 103, rotating the control feedback vector from a rotor centric platform to a stator centric value. The inverse Clarke converter 110 performs inverse Clarke transformations on the two outputs from inverse Park converter 108 to transform them from a two-dimensional signal into three output signals. The three output signals from the inverse Clarke converter 110 are provided to PWM controller block 112. The PWM controller, by varying the pulse width, provides a voltage in conformity with its input signal without the power loss of a linear regulator. The outputs from PWM controller block 112 are provided to inverter 122. The motor controller 102 further includes a Clarke converter 114 for respectively receiving three signals from motor 124 via current observer 126 and performing Clarke transformations thereon. The Clarke converter 114 converts the three input signals from motor 124 to two output signals, representing the current signal in the stator frame of reference. The two output signals from the Clarke converter 114 are fed into a Park converter 116 for performing Park transformations which are mathematically equivalent to complex rotations, transforming the current value to the frame of reference of the rotor. Park converter 116 provides outputs to respective proportionate-integral ("PI") Q controller 104 and proportionate-integral ("PI") D controller 106. PI Q controller 104 and PI D controller 106 can be viewed or considered together as a PI controller in the complex domain. PI Q controller 104 provides and handles the "Q" integral aspects of the PI controller while PI D controller 106 provides and handles the "D" integral aspects of the PI controller. The input target current $I_{target}$ to the control loop is the desired current.

During operation, the PWM controller block 112 of motor controller 102 provides continuous PWM signals to control inverter 122 so that inverter 122 can provide commanded voltage to each phase of motor 124 from power supply 120. Motor controller 102 provides control of motor 124 through the application of PWM signals from PWM controller block 112. Rotor position observer 118 determines the rotor position or angle and provides an angle signal, used as a rotation value, to the Park converter 116 and inverse Park converter 108.

Motor control systems and methods that use motor control loops are well known in the art. Such an exemplary prior art conventional motor control system and method are disclosed in U.S. Patent Application Publication No. US2012/0249033 to inventor Ling Qin entitled "Sensorless Motor Control" (hereafter referred to as '033 patent application). Paragraph 0005 of the '033 patent application further cites exemplary conventional motor control systems and methods in accordance with the prior art. Also, another prior art conventional motor control system and method are disclosed in the Texas Instruments' (TI) white paper entitled "Designing High-Performance and Power-Efficient Motor Control Systems" by Brett Novak and Bilal Akin dated June 2009. Such motor control systems and methods suffer from deficiencies.

For example, the current control in such motor control systems and methods that use motor control loops is less accurate than desired, largely due to the bandwidth limitations of the control loop. Thus, the current control accuracy and/or speed are often set by the delay in the feedback loop. Any outer control loops, such as the loops needed for speed or position, must similarly be decreased in bandwidth to provide phase margin. Referring to FIG. 1, system 100 shows PI Q controller 104 and PI D controller 106 receiving the input target current $I_{target}$. The outputs from PI Q controller 104 and PI D controller 106 are provided to inverse Park converter 108. PI Q controller 104 sets the desired current magnitude for controlling motor 124 while PI D controller 106 sets and provides a zero level reference. The Clarke and inverse Clarke converters 114 and 110 perform the transformations that handle the conversion from a winding of motor 124 to rectangular or complex coordinates. The Park and inverse Park converters 116 and 108 handle rotating the frame of reference for the PI control loops. Clarke and inverse Clarke converters and Park and inverse Park converters are well known in the art.

System 100 requires significant computation and adds feedback delay. A number of variants of the control topology of system 100 exist and are well known in the motor control art. A motor control system and method that requires a low or lower amount of computation requirements and has faster feedback control (e.g., low, lower, or minimal feedback delays) are desired.

SUMMARY OF THE INVENTION

A system and method of controlling a motor are disclosed. The system comprises an current observer for observing a motor current at a sampling rate and a proportionate-integral controller that provides a proportionate path and an integral path and at least forms part of a proportionate-integral control loop based on the motor current. The sample rate is normally synchronous with the PWM rate. The current observer observes a motor current of the motor at a sampling rate. The proportionate path calculates, for a present cycle of the sampling rate, a proportionate path term for the proportionate-integral control loop based on the motor current. The system outputs a respective motor output voltage to the motor in conformity with the proportionate path term calculated for the present cycle. In conformity with the motor current, the integral path calculates an integral path term for another respective motor output voltage to be used in a later cycle of the sampling rate.

In one embodiment, a system for controlling a motor comprises a motor current control feedback loop that receives an error current as an input and provides a respective motor output voltage for driving the motor as an output. The motor current control feedback loop has a current control algorithm block, a current observer for observing a motor current at a sampling rate, and a proportionate-integral controller that provides a proportionate path and an integral path and at least forms part of a proportionate-integral control loop based on the motor current. The motor current control feedback loop can further comprise an inverse Clarke converter that is used for processing the integral path term and a Clarke converter that is used for providing the proportionate path term.

In another embodiment, the integral path can calculate the integral path term by performing at least a Park transformation, an integral operation, and an inverse Park transformation on the motor current fed back from the motor. The calculation of the integral path term can involve defining state variables that are representative of D and Q integral aspects of the proportionate-integral control loop, combining the state variables into a complex state variable, and multiplying the complex state variable by a complex rotator that is set in conformity with a frequency of the motor. The proportionate path calculates the proportionate path term outside of the integral path. The system can be an integrated circuit.

DETAILED DESCRIPTION

In a feedback system such as system 100, a proportionate-integral (PI) controller (e.g., PI Q controller 104 and PI D controller 106) is typically used for feedback stabilization. The term provided by the PI controller provides direct current ("DC") accuracy while the P term provided by the PI controller gives loop stability. As PWM systems are nearly always operated in the Z (discrete time) sampled time domain, the transfer function of the PI controller is $a0+a1/(1-z^-1)$, where a0 is the P term, a1 is the I term, $1/(1-z^-1)$ is a discrete-time integrator in which $z^-1$ is a delay element. The design and optimization of such PI loops is well understood in the art.

$a0\ a1/(1-z^-1)$ is equivalent to $(a0+a1)\ a1*z^-1/(1-z^-1)$. $z^-1/(1-z^-1)$ is commonly known as a delaying integrator. Therefore, an equivalent PI loop can be constructed with a delaying integrator and slightly different coefficients resulting in the same loop response. The PI controller in a motor control is typically viewed as two real PI loops (e.g., loops comprising PI Q controller 104 and PI D controller 106) but can also be viewed as a single PI controller with complex inputs, outputs and state variables (the state variables being delay elements in the integrator). The coefficients remain real.

Figure 2:
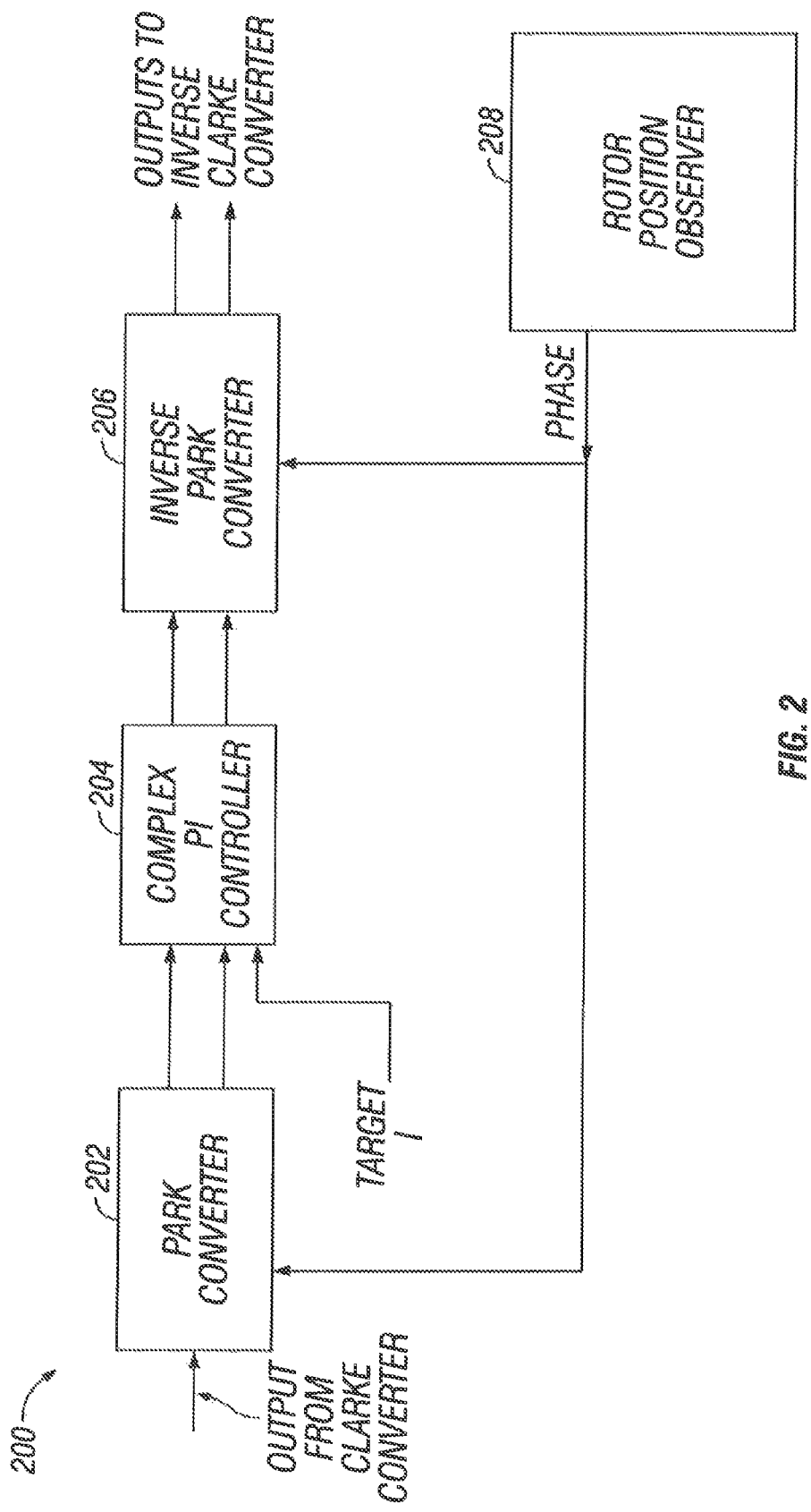
FIG. 2 is an exemplary mathematical block diagram of a system portion of an electric motor control system in accordance with the present disclosure illustrating the view of the PI controller being a complex PI controller.

FIG. 2 shows a system portion 200 of a motor control system that illustrate the key elements of the feedback controller for motor control in accordance with the present disclosure. System portion 200 illustrates the view of the PI controller being a complex PI controller 204 having complex inputs, outputs, and state variables (e.g., complex PI controller 204 has or acts as the delay element in the integrator). System portion 200 shows the Park converter 202 receiving the phase information of the motor from rotor position observer 208. Park converter 202 also receives as an input the output from a Clarke converter. Park converter 202 performs Park transformations on the signals from the Clarke converter, and the Park transformed outputs from Park converter 202 are fed into complex PI controller 204. The outputs of complex PI controller 204 are fed into inverse Park converter 206. Inverse Park converter 206 also receives the motor phase information from rotor position observer 208. Inverse Park converter 206 performs inverse Park transformations on the signals from complex PI controller 204 and provides the inverse Park transformed outputs to an Inverse Clarke converter.

If the variables for motor control system portion 200 are viewed as complex numbers (e.g., because of the complex PI controller 204), the Park transform operation performed by the Park converter 202 is a rotation of the phase in a positive direction while the inverse Park transform performed by the inverse Park converter 206 is a rotation of the phase in a negative direction. By simply constructing the PI controller 204 with a delaying integrator and allowing the PI controller 204 to be a complex PI controller and also by factoring out the P term, the computational delay is significantly reduced. The P term is subject to two rotations of the same magnitude in opposite directions, effectively canceling each other out.

Figure 3:
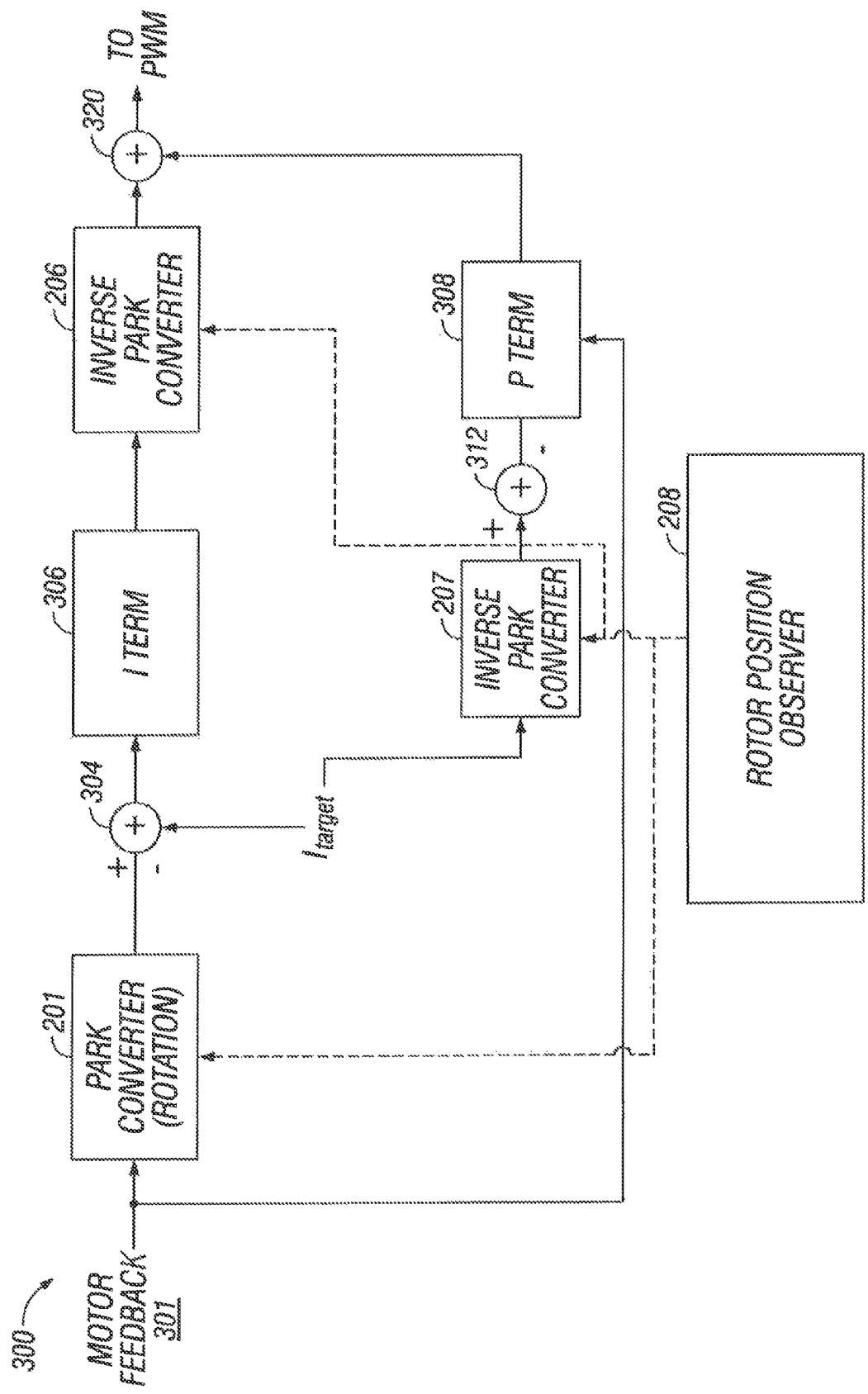
FIG. 3 is an exemplary functional block diagram of a system portion of an electric motor control system in accordance with the present disclosure illustrating a delaying integrator ("complex calculations") in the Park/Inverse Park transformation path while the proportionate ("P") term calculations are separated from the Park/Inverse Park transformation path.

FIG. 3 provides a motor control system portion 300 that is a functional rearrangement and re-ordering of the motor control system portion 200. System portion 300 shows the motor feedback signal 301 being fed into Park converter 202. Park converter 202 also receives phase information from rotor position observer 208. Park converter 202 performs a Park transform on the motor feedback signal 301 by using the phase information and performing a positive phase rotation on the motor feedback signal 301. Park converter 202 provides the Park transformed output as an input to adder 304. A target current $I_{target}$ is provided as another input to adder 304. Adder 304 performs an addition operation on the two input signals and provides its resulting output to a delaying integrator (e.g., I term block 306). The delaying integrator (e.g., I term block 306) provides its output as an input into the inverse Park converter 206. Inverse Park converter 206 also receives the target current output $I_{target}$ and the phase information from rotor position observer 208 as inputs and provides outputs to both adders 310 and 312. Inverse Park converter 206 performs an inverse Park transform on the target current $I_{target}$ by using the phase information and performing a negative phase rotation on that signal. Adder 312 receives as another input the motor feedback signal 301. Adder 312 performs an addition operation on its two inputs and provides its output to a proportionate block (e.g., P term block) 308. P term block 308 provides its output as a second input to adder 310. Adder 310 provides its output to a PWM block, such as PWM block 112 in FIG. 1.

Figure 1:
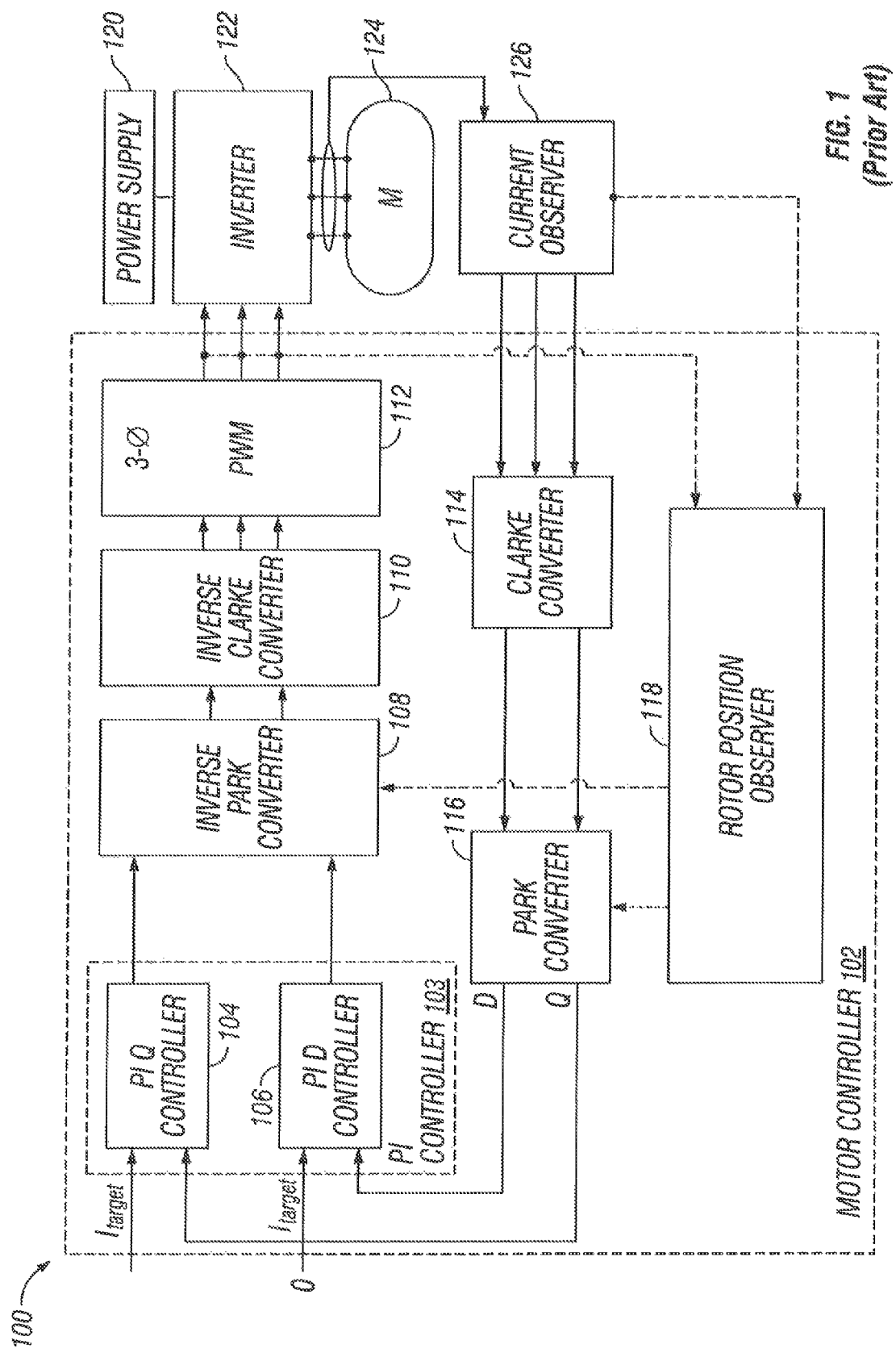
FIG. 1 is a conventional sensorless, field-oriented control (FOC) motor control system in accordance with the prior art.

System portion 300 is a functional rearrangement and re-ordering of system portion 200 because system portion 300 has a PI controller (such as a PI controller comprising PI Q controller 104 and PI D controller 106 in FIG. 1) in which the delaying integrator (e.g., I term block 306) is still maintained in the path of the Park converter 202 and inverse Park converter 206 while the proportionate ("P") term of the PI controller (e.g., P term block 308) is separated to another path that is outside of the path of the Park converter 202 and inverse Park converter 206. By constructing the PI controller with a delaying integrator (e.g., I term block 306 still in the Park/Inverse Park transformation path) and separating out the P term block 308 from the Park/Inverse Park transformation path, the overall mathematical calculations for the motor controller that incorporates a system portion 300 become much easier and faster, and the computational delays of the feedback loop are dramatically reduced. Thus, the path with the I term block 306 contains most of the computational load for the motor controller, and the calculation of the I term is used for a later cycle (whether the later cycle is a next cycle or subsequent cycle) of operation of the motor controller operating at a sampling rate. On the other hand, the calculation of the P term is used on a present cycle of operation of the motor controller operating at a sampling rate, and the calculation of the P term is not delayed or held up since it is separated from the complex calculations that are involved with the Park/Inverse Park transformation path. The arrangement of the P term block 308 in this manner allows for a much quicker way to determine the feedback value.

Figure 4:
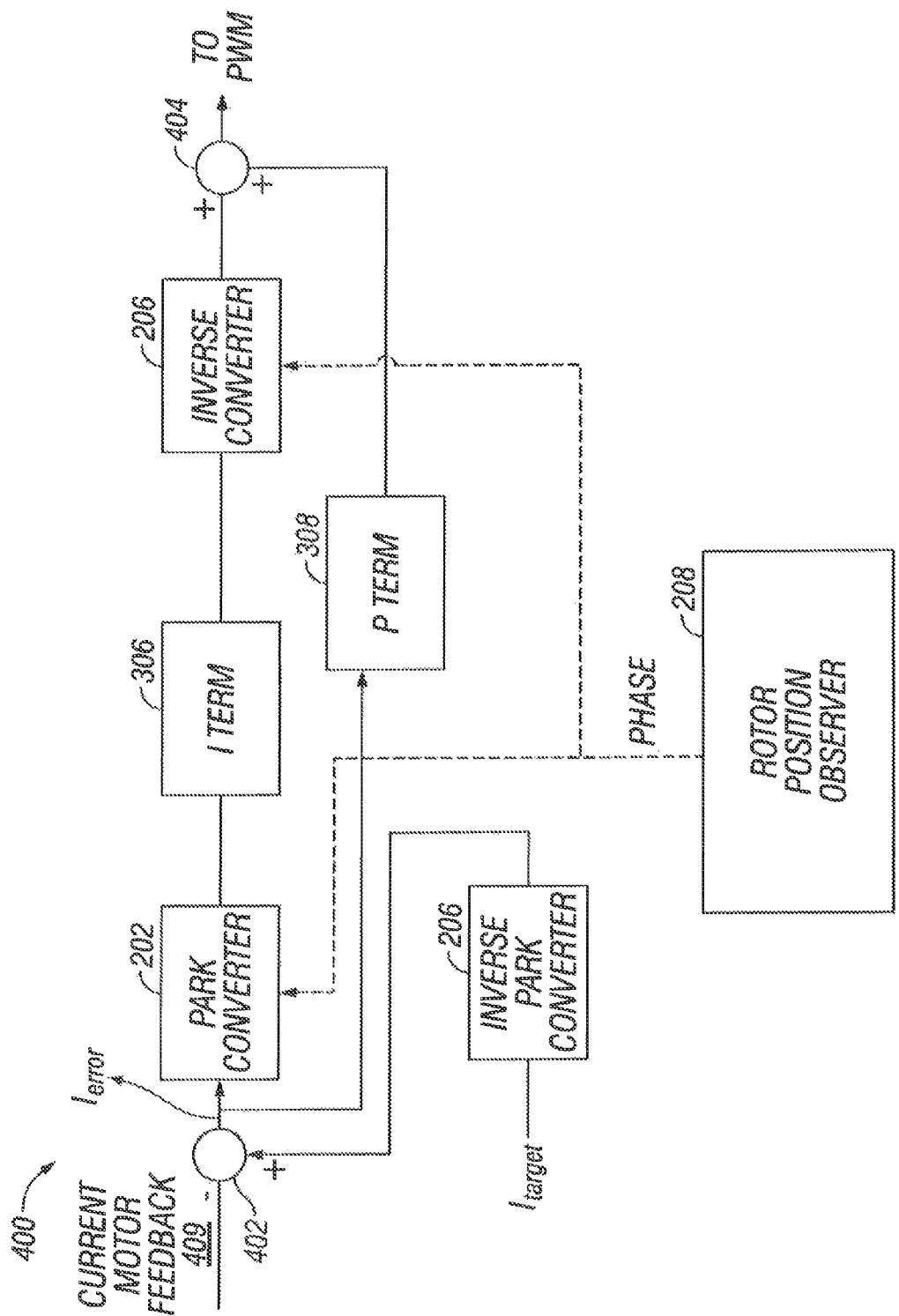
FIG. 4 is another exemplary functional block diagram of a system portion of an electric motor control system in accordance with the present disclosure illustrating a delaying integrator ("complex calculations") in the Park/Inverse Park transformation path while the proportionate ("P") term calculations are separated from the Park/Inverse Park transformation path.

FIG. 4 provides a motor control system portion 400 that is a further functional rearrangement and re-ordering of the motor control system portion 200. The entire feedback control loop of system portion 400 is driven by a current error signal in the frame of reference of the stator. System portion 400 shows the current motor feedback signal 401 being fed as an input into an adder 402. A target current $I_{target}$ is provided as an input to inverse Park converter 206. Inverse Park converter 206 performs an inverse Park transform on the target current $I_{target}$ and the inverse Park transformed signal is provided as an output that is another input to adder 402. Adder 402 performs an addition operation on its two input signals and provides as its output an error current $I_{error}$ that is determined/derived from the current motor feedback signal 401 and the inverse Park transformed signal from inverse Park converter 206. Error current $I_{error}$ is provided as an input to Park converter 202. The rotated and transformed $I_{target}$ can be pre-calculated before the current is observed on this sampling cycle.

Park converter 202 also receives phase information from rotor position observer 208. Park converter 202 performs a Park transform on the signal received from adder 402 by using the phase information and performing a positive phase rotation on that signal. Park converter 202 provides the Park transformed output as an input to a delaying integrator (e.g., I term block 306). The delaying integrator (e.g., I term block 306) performs a delayed integration on the Park transformed output and provides its output as an input into the inverse Park converter 206. Inverse Park converter 206 also receives the phase information from rotor position observer 208 as another input and provides an output to adder 404. Inverse Park converter 206 performs an inverse Park transform on the signal received from the I term block 306 by using the phase information and performing a negative phase rotation on that signal. Adder 404 receives as another input the output from proportionate block (e.g., P term block) 308. P term block 308 receives as its input the error current $I_{error}$, and P term block 308 provides its output as a second input to adder 404. Adder 404 performs an addition operation on its two inputs and provides its output to a PWM block, such as PWM block 112 in FIG. 1.

System portion 400 is a functional rearrangement and re-ordering of system portion 200 because system portion 400 has a PI controller (such as a PI controller comprising PI Q controller 104 and PI D controller 106 in FIG. 1) in which the delaying integrator (e.g., I term block 306) is also still maintained in the path of the Park converter 202 and inverse Park converter 206 while the proportionate ("P") term of the PI controller (e.g., P term block 308) is separated to another path that is outside of the path of the Park converter 202 and inverse Park converter 206. By constructing the PI controller with a delaying integrator (e.g., I term block 306 still in the Park/Inverse Park transformation path) and separating out the P term block 308 from the Park/Inverse Park transformation path, the overall mathematical calculations for the motor controller that incorporates a system portion 400 become much easier and faster in the time-critical portions, and the computational delays of the motor controller are dramatically reduced. In fact, the computational complexities for system portion 400 are even less than for system portion 300. The arrangement of the P term block 308 in this manner allows for a much quicker way to determine the feedback value.

As with system portion 300, system 400 similarly has a path with the I term block 306 that contains most of the computational delay for the motor controller, and the calculation of the I term is only needed for a later cycle (whether the later cycle is a next cycle or subsequent cycle) of operation of the motor controller operating at a sampling rate. On the other hand, the calculation of the P term is used on a present cycle of operation of the motor controller operating at a sampling rate, and the calculation of the P term is not delayed or held up since it is separated from the complex calculations that are involved with the Park/Inverse Park transformation path. The inverse Park transformation performed by inverse Park converter 206 on target current $I_{target}$ (normally a real value)

involves two real multiplication operations and can be performed in the prior operational control period of the motor controller operating at a sampling rate. The I term calculation done by the I term block 306 can be performed after the present cycle/period output, as a delaying integrator is used.

Figure 5A:
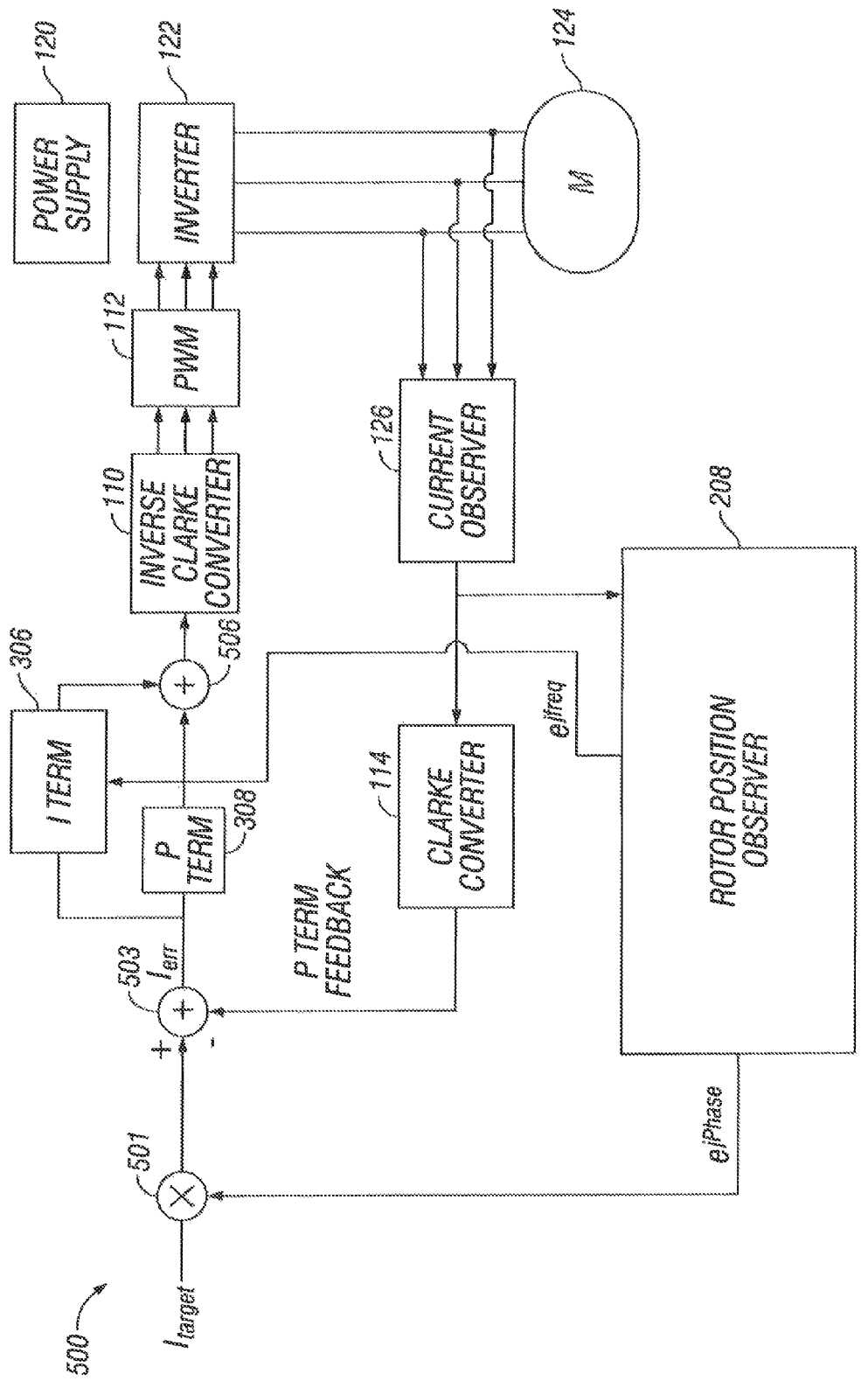
FIG. 5A is an exemplary block diagram of an electric motor control system in accordance with the present disclosure.

FIG. 5A shows an exemplary block diagram of an electric motor system 500 in accordance with the present invention. System 500 has a multiplier 501, an adder 503, an integral path ("I") term block 306, an adder 506, an inverse Clark converter 110 a PWM block 112, a current observer 126, a Clarke converter 114, a rotor position observer 208, a power supply 120, an inverter 122, and an electric motor ("M") 124 coupled in the manner shown in FIG. 5A. A target current $I_{target}$ is provided as an input to multiplier 501. Multiplier 501 also receives as another input a phasor value $e^{jphase}$ from rotor position observer 208. Multiplier 501 multiplies its two inputs and provides a resulting output to adder 503 as an input. Adder 503 receives a P term feedback signal, such as from P term block 308, as another input. The P term feedback signal is provided from current observer 126 observing the current signals from motor 124 and current observer 126 providing the observed current signals to a Clarke converter 114. Clarke converter 114 performs Clarke transformations on the signals received from current observer 126. The Clarke transformed output from Clarke converter 114 is fed to adder 503. As the Clarke and inverse Clarke transform are linear operations, the P term is not limited to calculation between the Clarke and inverse Clarke transforms but may be performed directly on the three signal motor signals. In this mode of implementation in which the calculations are performed directly, some further computational improvements may be possible.

Adder 503 adds the two inputs to provide as an output an error current $I_{error}$. Error current $I_{error}$ is fed into the I term block 306. I term block 306 also receives the phasor value $e^{jphase}$ from rotor position observer 208. The error current $I_{error}$ is also fed into adder 506 as an input, and adder 506 also receives the output of I term block 306 as another input. Adder 506 adds its two inputs and provides its output to inverse Clarke converter 110. Inverse Clarke converter 110 performs an inverse Clarke transformation on the output from adder 506 and provides the inverse Clarke transformed signals as an input to PWM block 112. PWM block 112 supplies its output signals to inverter 122 which is coupled to power supply 122 and motor 124.

Figure 5B:
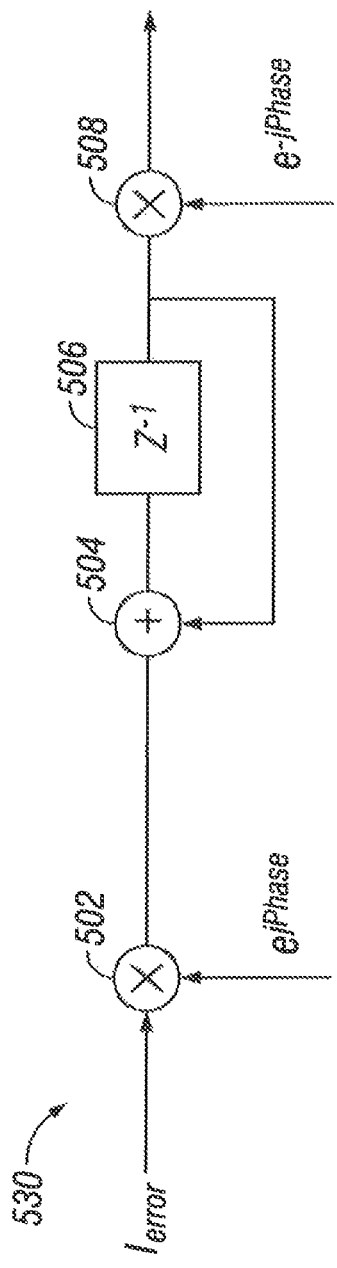
FIG. 5B is an exemplary mathematical implementation and model of the integral path term block of FIG. 5 illustrating the D and Q integral aspects being processed separately.

FIG. 5B shows an exemplary embodiment of a mathematical implementation and model 530 for the integral path term 306 shown in FIG. 5A. Mathematical implementation and model 530 shows a multiplier 502 multiplying the error current $I_{error}$ with a phasor value $e^{jphase}$ The resulting output of multiplier 502 is provided to adder 504. The output of adder 504 is then fed into delay ($Z^{-1}$) block 506. The output of delay block 506 is fed to another multiplier 508 and also fed back as another input to adder 504. Another input to multiplier 508 is an inverse phasor value $e^{-jphase}$. Multiplier 508 multiplies the output from the inverse delay block 506 with the inverse phasor value $e^{-jphase}$ and provides a respective multiplication result. Mathematical implementation and model 530 shows all of its values and calculations as being complex.

Two multipliers 502 and 508 are shown in model 530 because they are reflective of the complex nature of the mathematical calculations for model 530. The mathematical calculations for model 530 are complex for at least the reason of the PI controller being inclusive of PI Q controller 104 and PI D controller 106. As indicated earlier, PI Q controller 104 provides the Q integral aspects of the PI controller while the PI D controller 106 provides the D integral aspects of the PI controller. Since two integral aspects need to be mathematically processed in model 530, two multipliers 502 and 508 are needed. State variables that are representative of the D and Q integral aspects of the integrator are defined and used for the calculations in model 530.

Figure 5C:
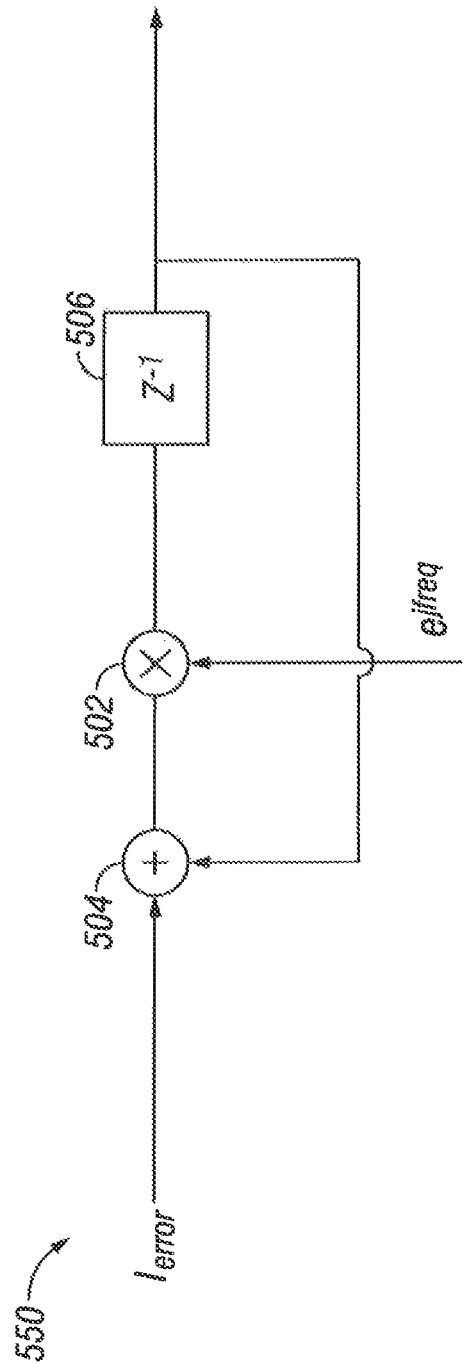
FIG. 5C is another exemplary mathematical implementation and model of the integral path term block of FIG. 5 illustrating the D and Q integral aspects being combined and then processed.

FIG. 5C shows another exemplary embodiment of a mathematical implementation and model 550 for the integral path term 306 shown in FIG. 5A. Mathematical implementation and model 550 shows an adder 504, a multiplier 502, and an delay (V) block 506 coupled together in series. Adder 504 adds the error current $I_{error}$ and the fed-back output signal of inverse delay ($Z^{-1}$) block 506. The resulting output of adder 504 is fed into multiplier 502. Multiplier 502 also receives as another input a frequency compensation factor $e^{-jfreq}$. Complex multiplier 502 multiplies the resulting output from adder 504 and the frequency compensation factor $e^{-jfreq}$ and provides the multiplied output to delay block 506, delay block 506 provides the resulting mathematical output.

Mathematical implementation and model 550 show a reduction in computation from mathematical implementation and model 530 because model 550 uses frequency rotation, in which the frequency is the derivative of the phase. Model 550 still involves defining state variables that are representative of the D and Q integral aspects of the integrator. However, model 550 further involves combining the state variables into a single complex state variable that is maintained in the stator frame of reference. The single complex state variable is further multiplied by a complex rotator. The complex rotator is set in conformity with a frequency of the motor (e.g., motor 124). Thus, model 550 requires only one multiplier 502 performing only one complex multiplication operation because the state variables have been combined into a single complex state variable.

Figure 6:
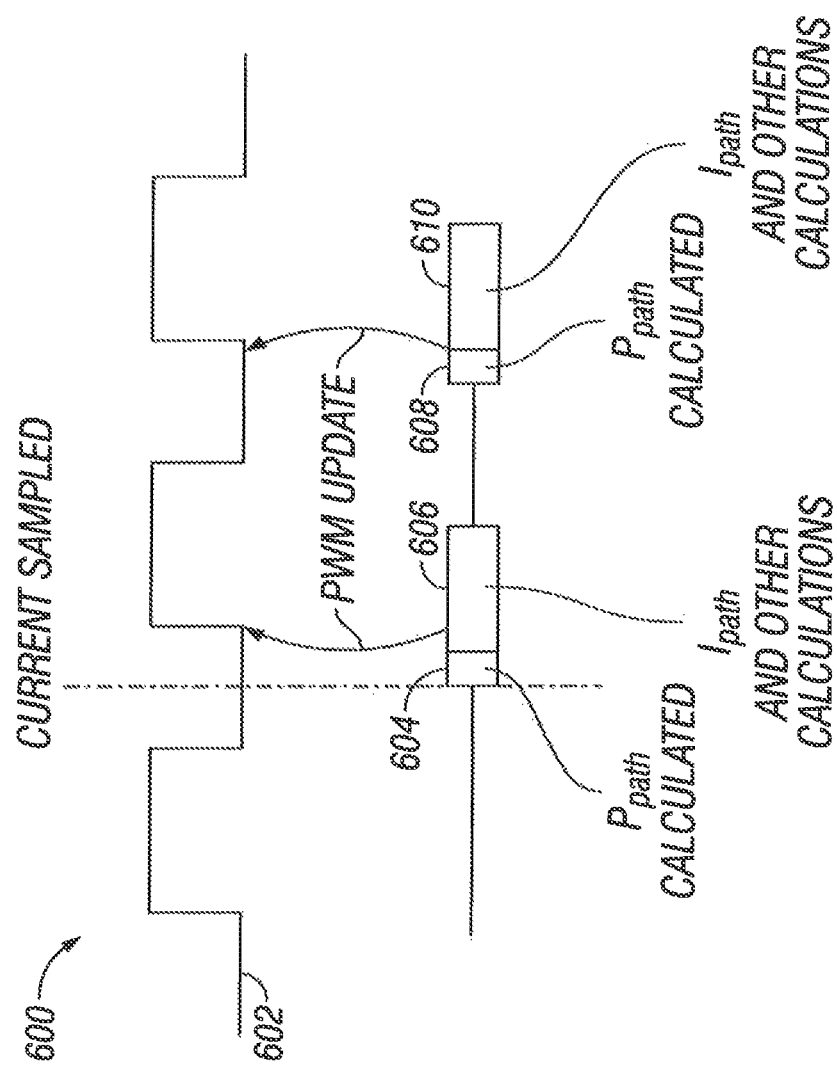
FIG. 6 is an exemplary timing diagram illustrating the error current being sampled by the system portion in accordance with the present disclosure and showing how the error current sampling relates to a pulse width modulation (PWM) operational cycle of the motor control system.

FIG. 6 shows a timing diagram 600 of the error current $I_{error}$ being sampled and how the error current sampling relates to a pulse width modulation (PWM) cycle. PWM waveform 602 shows the cycles within which the proportionate path calculations and the integral path calculations are performed. Timing diagram 600 shows that within one sampling cycle, proportionate path calculations are performed within time interval 604 while the integral path calculations are performed within the time interval 606. Timing diagram 600 further shows for a later cycle (whether the later cycle is a next cycle or subsequent cycle), proportionate path calculations are performed within time interval 608 while the integral path calculations are performed within the time interval 610.

During a PWM update period, the proportionate path calculations are more quickly performed and allow the current error to be determined in a PWM trough (e.g., the time period that at least includes time intervals 606 and 608 as shown in FIG. 6). At a later leading edge (that can be either a next leading edge or a subsequent leading edge) of the PWM waveform 602 (e.g., the leading edge that occurs between time interval 608 and time interval 610), the proportionate path calculations (and thus the error current for the later PWM cycle) are already determined and up to date before all computations (e.g., the integral path calculations) and other control functions are completed. In other words, the proportionate path calculations are already performed and up-to-date for the present PWM cycle while the integral path calculations are still being performed for a later PWM cycle (whether the later PWM cycle is a next PWM cycle or subsequent PWM cycle). Such a motor control system arrangement allows for faster feedback, provides for more loop bandwidth and phase margin for the closed loop system, provides higher signal fidelity, and faster response, as well as allows operation at higher motor speeds when compared with conventional motor control operations.

Although embodiments have been described in detail, it should be understood that various changes, substitutions, and alterations can be made hereto without departing from the spirit and scope of the invention as defined by the appended claims.

What is claimed is:

1. A method of controlling a motor, comprising:
   observing a motor current of the motor at a sampling rate;
   calculating, for a present cycle of the sampling rate, a proportionate path term for a proportionate-integral control loop based on the motor current;
   outputting a respective motor output voltage to the motor in conformity with the proportionate path term calculated for the present cycle; and
   in conformity with the motor current, calculating an integral path term for another respective motor output voltage to be used in a later cycle of the sampling rate.

2. The method according to claim 1, further comprising:
   using an inverse Clarke converter to process the integral path term; and
   using a Clarke converter to provide the proportionate path term.

3. The method according to claim 1, wherein calculating an integral path term further comprises:
   calculating, by an integral path, the integral path term by performing at least a Park transformation, an integral operation, and an inverse Park transformation on the motor current fed back from the motor.

4. The method according to claim 3, wherein calculating, for a present cycle of the sampling rate, a proportionate path term further comprises:
   calculating, by a proportionate path, the proportionate path term outside of the integral path.

5. The method according to claim 1, wherein calculating an integral path term further comprises:
   defining state variables that are representative of D and Q integral aspects of the proportionate-integral control loop;
   combining the state variables into a complex state variable; and
   multiplying the complex state variable by a complex rotator that is set in conformity with a frequency of the motor.

6. The method according to claim 1, wherein the later cycle is a next cycle of the sampling rate.

7. The system according to claim 6, wherein the integral path calculates the integral path term by defining state variables that are representative of D and Q integral aspects of the proportionate-integral control loop, combining the state variables into a complex state variable, and multiplying the complex state variable by a complex rotator that is set in conformity with a frequency of the motor.

8. A system for controlling a motor, comprising:
   a motor current control feedback loop that receives an error current as an input and provides a respective motor output voltage for driving the motor as an output wherein the motor current control feedback loop has a current control algorithm block, a current observer for observing a motor current at a sampling rate, and a proportionate-integral controller that provides a proportionate path and an integral path and at least forms part of a proportionate-integral control loop based on the motor current; and
   wherein, for a present cycle of the sampling rate, the proportionate path calculates a proportionate path term for the proportionate-integral control loop; wherein the respective motor output voltage to the motor is outputted in conformity with the proportionate path term calculated for the present cycle; and
   wherein, in conformity with the motor current, the integral path calculates an integral path term for another respective motor output voltage to be used in a later cycle of the sampling rate.

9. The system according to claim 8, wherein the motor current control feedback loop further comprises:
   an inverse Clarke converter that is used for processing the integral path term; and
   a Clarke converter that is used for providing the proportionate path term.

10. The system according to claim 8, wherein the integral path further comprises at least:
    a Park converter for performing a Park transformation on the motor current fed back from the motor;
    an integrator block coupled to the Park converter wherein the integrator block performs integration on signals from the Park converter; and
    an inverse Park converter coupled to the integrator block wherein the inverse Park converter performs an inverse Park transformation on integrated signals from the integrator block.

11. The system according to claim 10, wherein the proportionate path calculates the proportionate path term outside of the integral path.

12. The system according to claim 8, wherein the later cycle is a next cycle of the sampling rate.

13. The system according to claim 8, wherein the system is an integrated circuit.

14. A method for calculating an integral path term of an integral path for a proportionate-integral control loop for a motor controller controlling a motor current for a motor, comprising:
    defining state variables that are representative of D and Q integral aspects of the proportionate-integral control loop;
    combining the state variables into a complex state variable; and
    multiplying the complex state variable by a complex rotator that is set in conformity with a frequency of the motor.

15. The method according to claim 14, further comprising:
    using an inverse Clarke converter for processing the integral path term.

16. The method according to claim 14, wherein defining state variables, combining the state variables, and multiplying the complex state variable by a complex rotator further comprises:
    performing at least a Park transformation, an integral operation, and an inverse Park transformation on the motor current fed back from the motor.

17. A system for calculating an integral path term of an integral path for a proportionate-integral control loop for a motor controller controlling a motor current for a motor, comprising:
    a proportionate-integral control loop having state variables defined that are representative of D and Q integral aspects of the proportionate-integral control loop, wherein the state variables are combined into a complex state variable and the complex state variable is multiplied by a complex rotator that is set in conformity with a frequency of the motor.

18. The system according to claim 17 further comprising:
an inverse Clarke converter that is used for processing the integral path term.

19. The system according to claim 17, wherein the integral path further comprises:
a Park converter for performing a Park transformation on the motor current fed back from the motor;
an integrator block coupled to the Park converter wherein the integrator block performs integration on signals from the Park converter; and
an inverse Park converter coupled to the integrator block wherein the inverse Park converter performs an inverse Park transformation on integrated signals from the integrator block.

20. The system according to claim 17, wherein the system is an integrated circuit.

* * * * *